(12) United States Patent
Tian et al.

(10) Patent No.: US 8,076,856 B2
(45) Date of Patent: Dec. 13, 2011

(54) LED LAMP

(75) Inventors: Feng Tian, Shenzhen (CN); Tay-Jian Liu, Taipei Hsien (TW); Guang-You Lu, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 265 days.

(21) Appl. No.: 12/626,685

(22) Filed: Nov. 27, 2009

(65) Prior Publication Data

US 2011/0068692 A1   Mar. 24, 2011

(30) Foreign Application Priority Data

Sep. 24, 2009   (CN) .......................... 2009 1 0307609

(51) Int. Cl.
*H05B 39/10* (2006.01)

(52) U.S. Cl. ............ 315/91; 315/88; 315/291; 315/312; 315/185 S

(58) Field of Classification Search .............. 315/86–91, 315/185 S, 291, 307–311, 312–326, 224, 315/247
See application file for complete search history.

(56) References Cited

U.S. PATENT DOCUMENTS 3,808,499 A * 4/1974 Edwards ...................... 315/86
* cited by examiner

*Primary Examiner* — Tuyet Thi Vo
(74) *Attorney, Agent, or Firm* — Altis Law Group, Inc.

(57) ABSTRACT

An LED lamp includes an optical part, a heat dissipation part and an electric part. The optical part includes main and auxiliary LED light sources thermally attached to the heat dissipation part. The electric part includes a rechargeable battery and a circuitry for converting an external AC power source into first and second DC power sources. The auxiliary LED light source is connected to the first DC power source for providing an auxiliary illumination when the external AC power source is normally supplied or to the rechargeable battery for providing an emergency illumination when the external AC power source is interrupted. The main LED light source is connected to the second DC power source for providing normal illumination when the external AC power source is supplied normally. Photoelectric switches are also provided for controlling the action of the auxiliary LED light source.

10 Claims, 6 Drawing Sheets

LED LAMP

BACKGROUND

1. Technical Field

The disclosure generally relates to light emitting diode (LED) lamps, and particularly to an LED lamp which is capable of providing both normal and emergency illuminations.

2. Description of Related Art

To resolve the problem of global warming and natural resource exhaustion, low power consuming electrical devices are required. LED lamps are developed to meet the power-saving trend. LED lamps having LEDs (light emitting diodes) are preferable for use to CCFLs (cold cathode fluorescent lamps) and other traditional lamps due to the excellent properties, including high brightness, low power consumption, long lifespan, environment friendliness, rapid start-up, directivity, etc of the LEDs.

Nowadays, LEDs have been used in both a general lamp for normal illumination and an emergency lamp for emergency illumination. However, the conventional LED-type general lamp is individually designed for normal illumination where an external alternating current (AC) power source is readily available, without making the most use of an environment illumination enhanced the insufficient normal illumination by auxiliary illumination for energy-saving. The conventional LED-type emergency illumination is typically installed in places such as hallways, stairs, passageways, and other areas needing an emergency illumination, without making the most use of the environment illumination extended the emergency illumination period by auxiliary illumination for safety. The conventional LED-type emergency illumination is constantly inactive, except when the AC power source to the conventional LED-type general lamp is interrupted. To equip a same area with both the general and emergency lamps is costly in money and space.

Therefore, it is desirable to provide an LED lamp which is capable of providing normal, auxiliary and emergency illuminations.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

Figure 1:
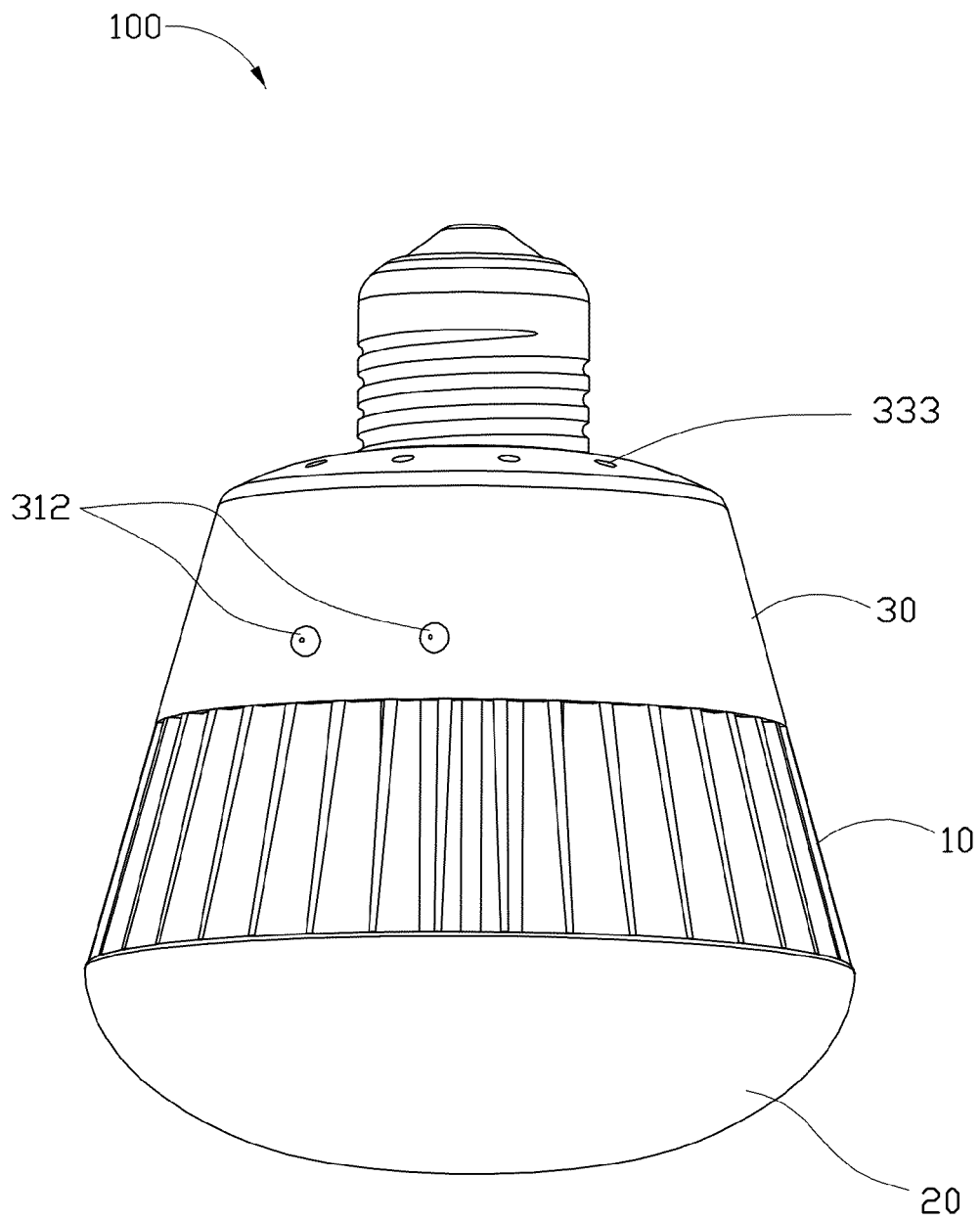
FIG. 1 is an assembled, isometric view of an LED lamp in accordance with an exemplary embodiment of the present disclosure.
Figure 2:
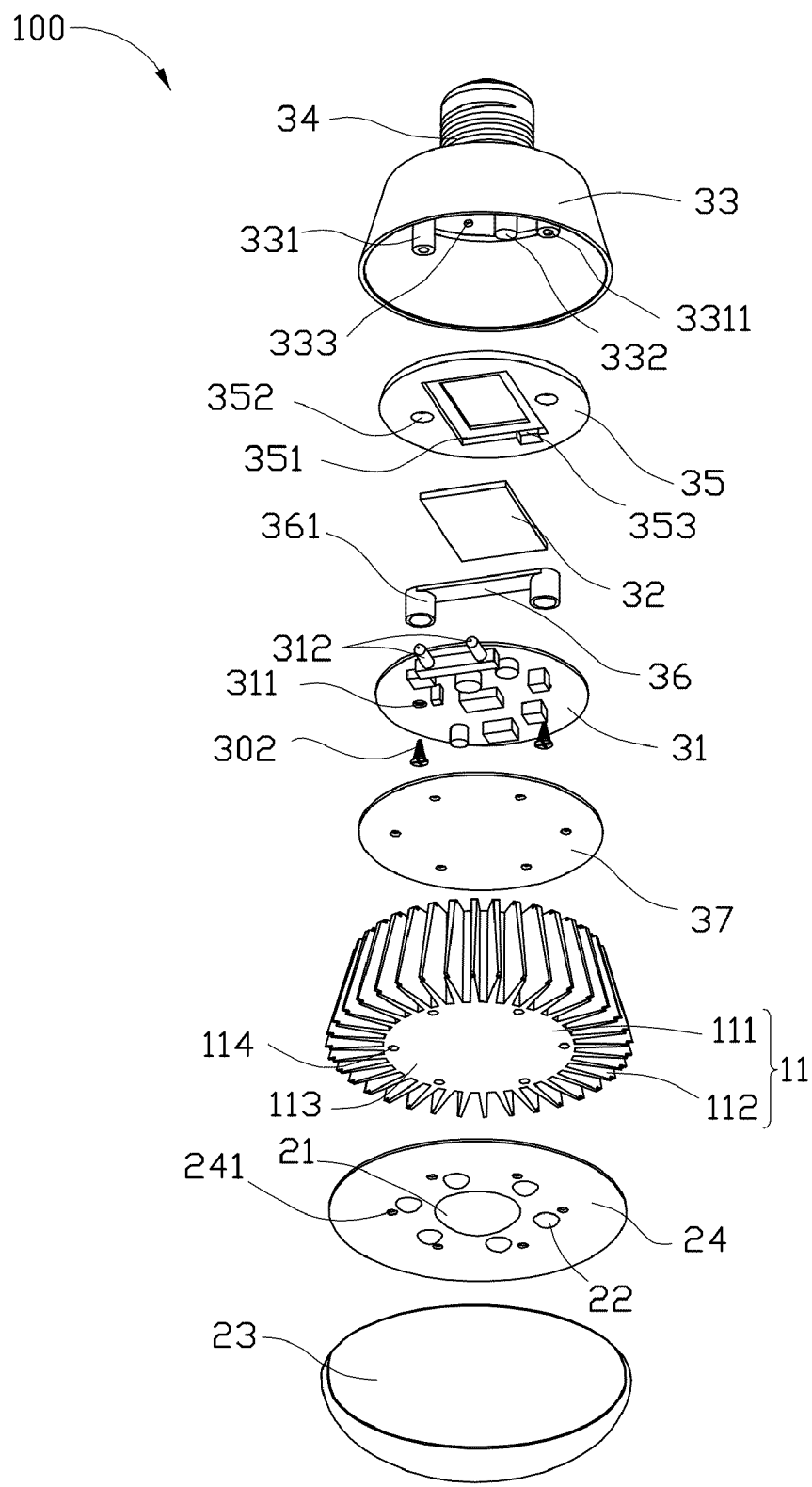
FIG. 2 is an exploded, isometric view of the LED lamp of FIG. 1.
Figure 3:
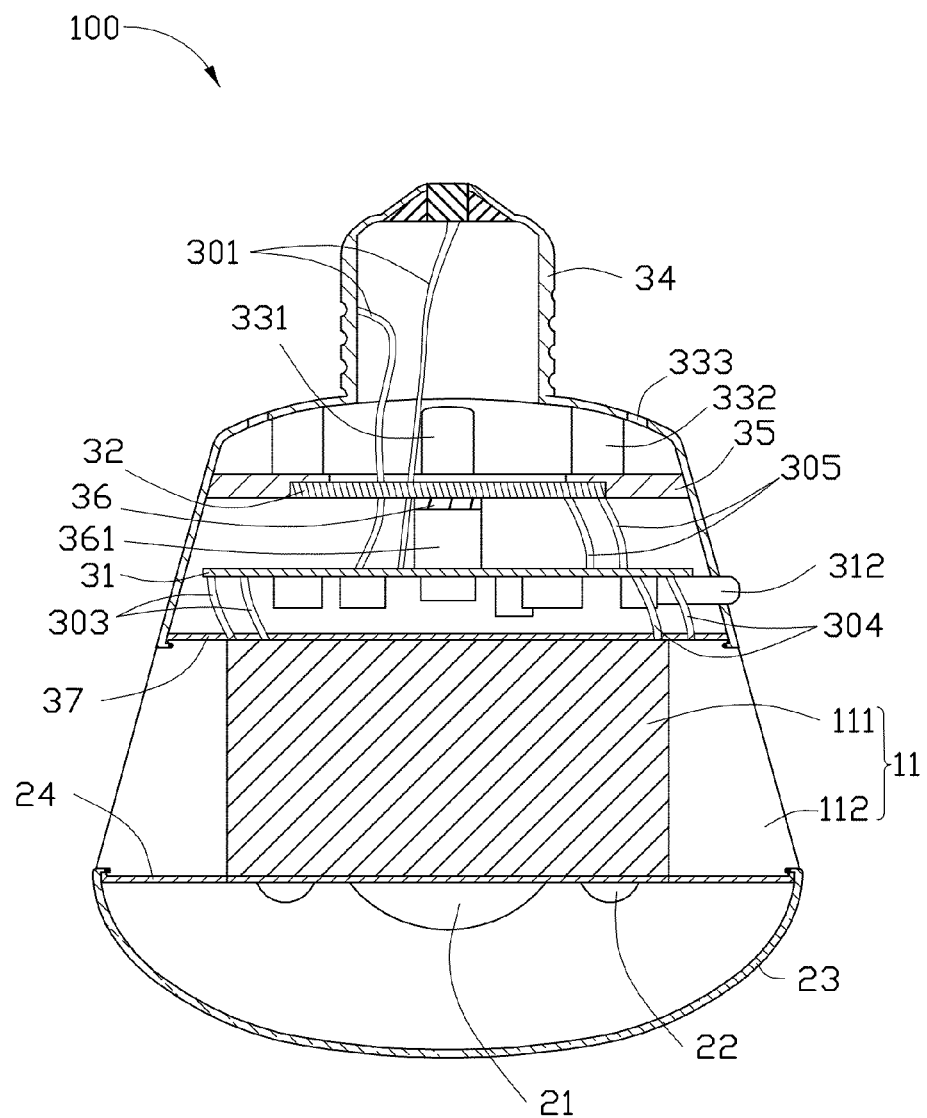
FIG. 3 is a cross-sectional view of the LED lamp of FIG. 1.

Referring to FIGS. 1-3, an LED lamp 100 according to an exemplary embodiment of the present disclosure includes a heat dissipation part 10, an optical part 20, and an electric part 30. The LED lamp 100 is capable of providing normal, auxiliary and emergency illuminations.

The heat dissipation part 10 includes a heat sink 11. The heat sink 11 is made of a material having a high thermal conductivity, such as aluminum or aluminum alloy. The heat sink 11 is substantially in the form of a conical frustum. The heat sink 11 includes a column-shaped base 111 and a plurality of fins 112 extending outwardly from a circumferential surface of the base 111. A front end of the base 111 adjacent to the optical part 20 forms a heat absorbing surface 113. The fins 112 extend from the front end of the base 111 towards a rear end of the base 111 adjacent to the electric part 30. A radial height of each fin 112 is gradually decreased from the front end towards the rear end of the base 111. Thus heat absorbed by the heat absorbing surface 113 can be rapidly and evenly dissipated to the ambient atmosphere via the fins 112.

The optical part 20 is arranged at a front end of the heat dissipation part 10. The optical part 20 includes a main LED light source 21, an auxiliary LED light source 22 and a lamp cover 23. The main LED light source 21 is used for normal illumination, while the auxiliary LED light source 22 is used for auxiliary illumination and emergency illumination. Both the main LED light source 21 and the auxiliary LED light source 22 are LEDs. A power consumed by the main LED light source 21 is larger than a power consumed by the auxiliary LED light source 22.

Figure 6:
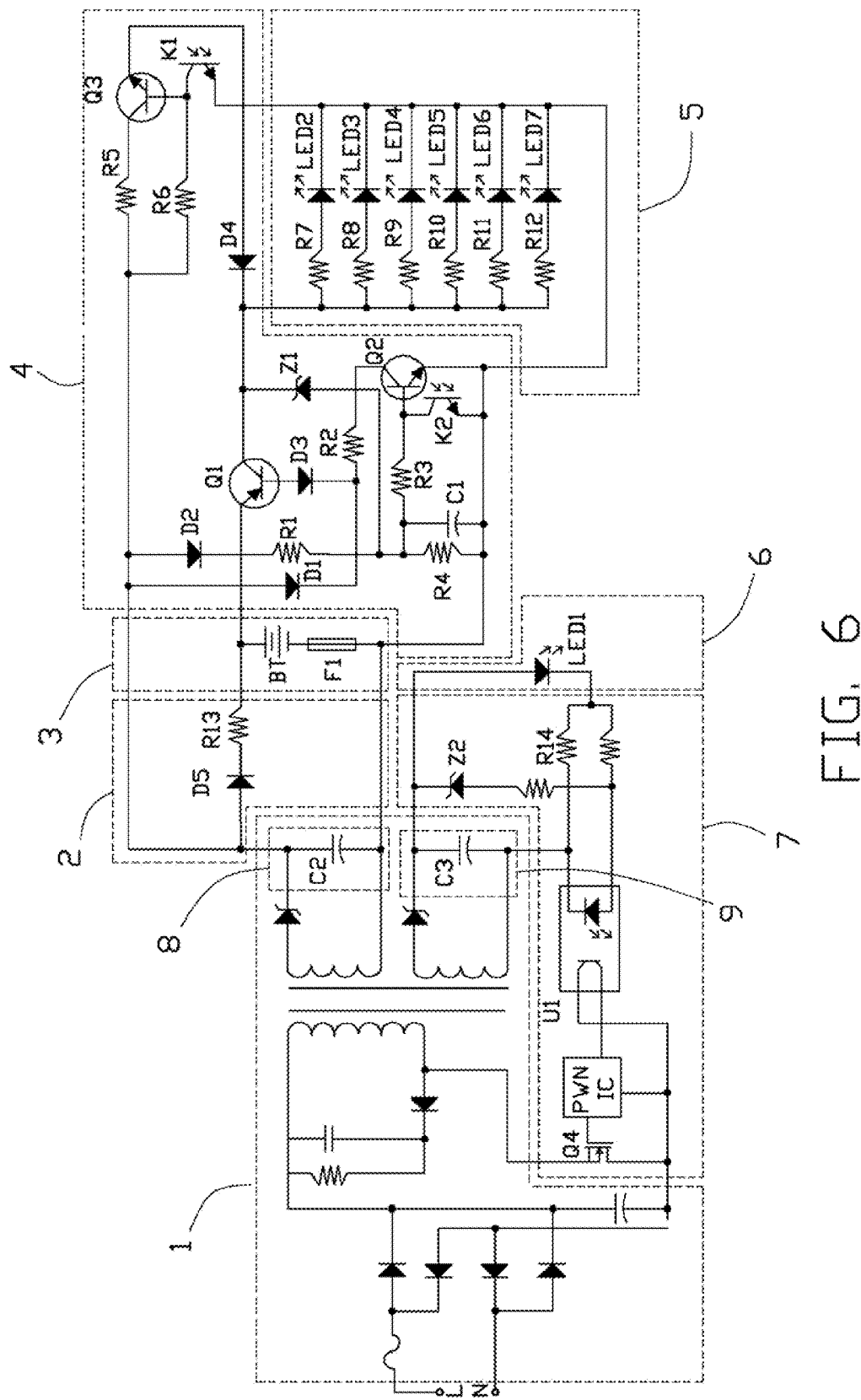
FIG. 6 shows a circuit diagram of the control module in the LED lamp of FIG. 1.

In this embodiment, the main LED light source 21 includes a first LED (i.e., LED1, see FIG. 6), while the auxiliary LED light source 22 includes a plurality of second LEDs (i.e., LED2-LED7, see FIG. 6). The first LED of main LED light source 21 and the second LEDs of the auxiliary LED light source 22 are together attached on a circular substrate 24, where the second LEDs of the auxiliary LED light source 22 are arranged around the first LED of the main LED light source 21. The substrate 24 is attached on the heat absorbing surface 113 of the heat sink 11, whereby heat generated by the first LED of the main LED light source 21 and the second LEDs of the auxiliary LED light source 22 can be conducted to the heat sink 11 via the substrate 24 and then dissipated to the ambient atmosphere via the fins 112.

A layer of thermal interface material (TIM) may be applied between the substrate 24 and the heat absorbing surface 113 of the heat sink 11 to eliminate an air interstice therebetween, to thereby enhance a thermal conduction efficiency between the heat sink 11 and the substrate 24. The substrate 24 defines a plurality of mounting holes 241 therein. Fasteners (not shown) such as screws are adopted to extend through the mounting holes 241 to fix the substrate 24 onto the heat absorbing surface 113 of the heat sink 11. Alternatively, the substrate 24 can be attached to the heat absorbing surface 113 of the heat sink 11 fixedly and intimately through surface mount technology (SMT). The substrate 24 has an outer diameter substantially equal to that of the front end of the heat sink 11, whereby the optical part 20 is separated from the heat dissipation part 20 via the substrate 24, preventing hot air heated by the fins 112 and moisture in the ambient atmosphere from entering the optical part 20.

The lamp cover 23 is located in front of the heat dissipation part 10 and mounted to the heat sink 11. The lamp cover 23 is transparent or translucent, and has a configuration of a substantially hollow hemisphere. A peripheral edge of the lamp cover 23 engages with the fins 112 at a front end of the heat sink 11 to mount the lamp cover 23 onto the heat sink 11. The lamp cover 23 covers the main LED light source 21 and auxiliary LED light source 22 therein to protect the first LED and the second LEDs from dust and external damage. The lamp cover 23 further functions as an optical lens for the main LED light source 21 and auxiliary LED light source 22 to guide light emitted by the first LED of the main LED light source 21 and the second LEDs of the auxiliary LED light source 22 to the ambient environment.

The electric part 30 is arranged at a rear end of the heat dissipation part 10. The electric part 30 includes a circuit board 31, a rechargeable battery 32 (which is designated by symbol "BT" in FIG. 6), a shell 33 and a lamp cap 34.

The shell 33 is cup-shaped, and has an open end facing and connected to the heat dissipation part 10. The lamp cap 34 is arranged at a rear end of the shell 33 far from the heat dissipation part 10. The LED lamp 100 can be mounted to a lamp holder (not shown) via the lamp cap 34 to obtain electric current from an external alternating current (AC) power source. The shell 33 forms a pair of positioning posts 331 and a pair of supporting posts 332 (best see in FIG. 3) on an inner surface thereof. The pair of positioning posts 331 axially extends beyond the pair of the supporting posts 332. A mounting hole 3311 is defined in an end of each of the pair of the positioning posts 331. A plurality of air apertures 333 are defined through the shell 33 at a position adjacent to and around the lamp cap 34. The air apertures 333 communicate an inner space of the shell 33 with the ambient environment and are utilized for dissipating heat generated by the circuit board 31.

The circuit board 31 is received in the shell 33. The circuit board 31 defines two fixing holes 311 therein corresponding to the mounting holes 3311 of the pair of the positioning posts 331. Two photoelectric switches 312 are formed on the circuit board 31 and extend out of the shell 33 for sensing the brightness of the environment. In this embodiment, the photoelectric switches 312 are phototransistors K1, K2 (particularly see in FIG. 6). The circuit board 31 is electrically connected to the main LED light source 21 and the auxiliary LED light source 22 via two groups of electrical wires 303, 304, respectively. The rechargeable battery 32 is also received in the shell 33 and electrically connected to the circuit board 31 via a group of electrical wires 305.

In order to fix the circuit board 31 and the rechargeable battery 32 in the shell 33 conveniently, the electric part 30 further includes a supporting plate 35 and a pressing plate 36 received in the shell 33. The supporting plate 35 is circular and defines a rectangular receiving groove 351 in a front surface thereof facing the heat dissipation part 10 for receiving the rechargeable battery 32. The supporting plate 35 further defines a pair of through holes 352 and a wire hole 353 therein. The pair of through holes 352 of the supporting plate 35 is used for the pair of positioning posts 331 of the shell 33 extending therethrough. A pair of electrical wires 301 extends through the wire hole 353 of the supporting plate 35 to connect the circuit board 31 with the lamp cap 34. The pressing plate 36 forms two sleeves 361 at two ends thereof corresponding to the pair of the positioning posts 331 of the shell 33.

When the rechargeable battery 32 and the circuit board 31 are fixed in the shell 33, the positioning posts 331 of the shell 33 extend through the through holes 352 of the supporting plate 35 to allow the supporting posts 332 abut against and support the supporting plate 35. After the rechargeable battery 32 is mounted in the receiving groove 351 of the supporting plate 35, the positioning posts 331 extend through the sleeves 361 of the pressing plate 36 to mount the pressing plate 36 onto the rechargeable battery 32. Two screws 302 extend through the fixing holes 311 of the circuit board 31 and threadedly engage into the mounting holes 3311 of the positioning posts 331, to thereby securely fix the circuit board 31 and the rechargeable battery 32 in the shell 33. The circuit board 31 and the rechargeable battery 32 are spaced from each other via the sleeves 361 of the pressing plate 36.

A front end of the shell 33 adjacent to the heat dissipation part 10 is connected to the fins 112 at a rear end of the heat sink 11 to mount the electric part 30 to the heat dissipation part 10. To improve the safety of the LED lamp 100, a circular protecting plate 37 made of electrically insulating material is arranged between the electric part 30 and the heat dissipation part 10 and mounted to the rear end of the heat sink 11. The protecting plate 37 electrically insulates the electric part 30 from the heat dissipation part 10 to prevent electrostatic charges carried by a user from reaching the circuit board 31 via the heat sink 11 and prevent outside object from entering into the electric part 30.

Figure 4:
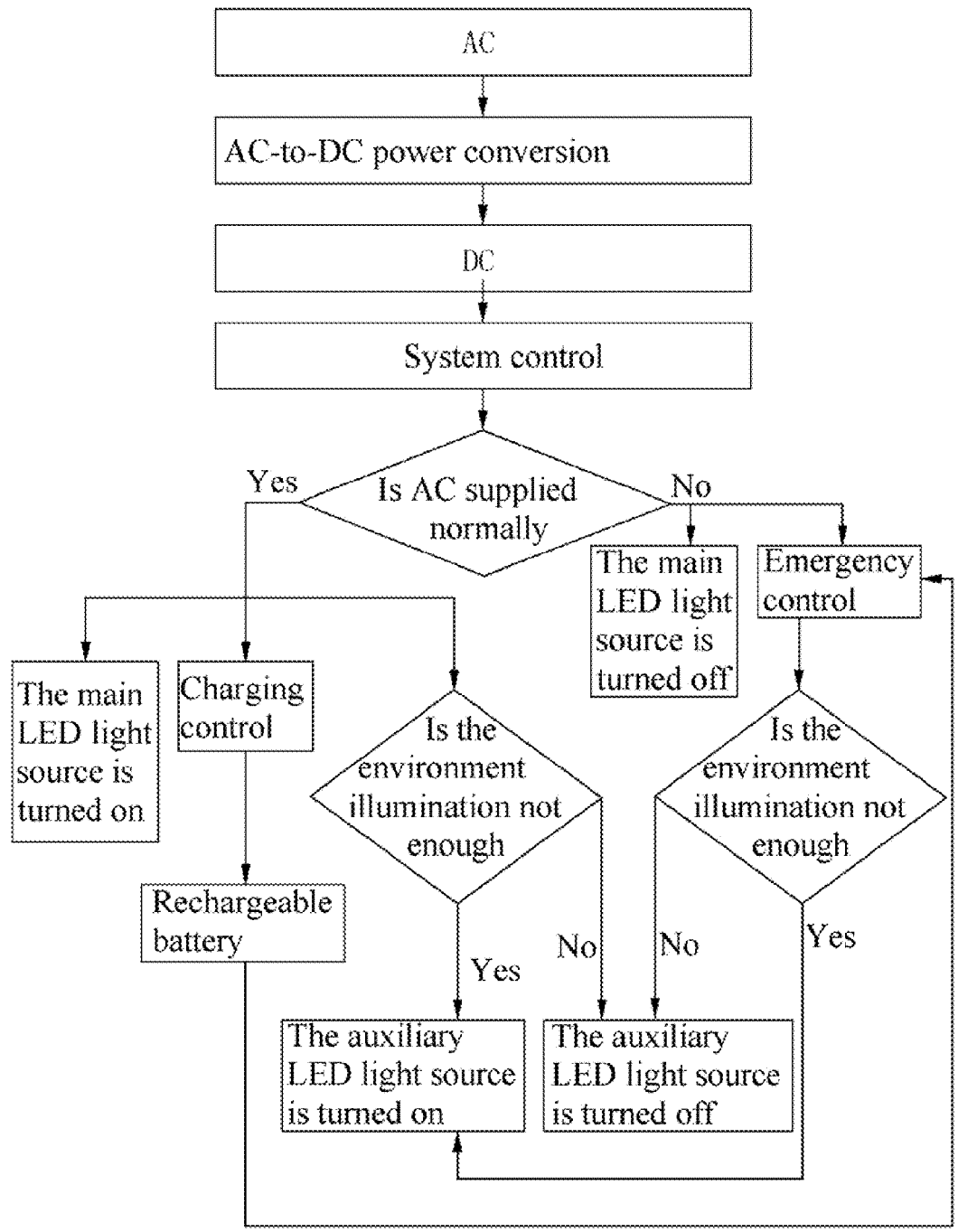
FIG. 4 is a flowchart illustrating an operation of the LED lamp of FIG. 1.

Referring to FIG. 4, in operation, the external AC power source transferred to the circuit board 31 is converted into direct current (DC) power source via AC-to-DC power conversion. Then system control is started. When the external AC power source is supplied normally, the DC power source converted from the external AC power source is supplied to the main LED light source 21 and the rechargeable battery 32. As a result, the main LED light source 21 is turned on to emit light for providing normal illumination and the rechargeable battery 32 is charged via charging control. At this time, if the environment illumination is enough (determined by the photoelectric switches 312), no DC power source will be supplied to the auxiliary LED light source 22. Thus the auxiliary LED light source 22 is turned off. If the environment illumination is not enough (determined by the photoelectric switches 312), the DC power source is also supplied to the auxiliary LED light source 22 to cause the auxiliary LED light source 22 to lighten for providing auxiliary illumination.

When the external AC power source supply is interrupted, the main LED light source 21 is turn off because no DC power source is supplied to the main LED light source 21. The auxiliary LED light source 22 runs in emergency state and is controlled by emergency control. At this time, if the environment illumination is enough, the rechargeable battery 32 will not supply DC current to the auxiliary LED light source 22. Thus the auxiliary LED light source 22 is turned off. If the environment illumination is not enough, the rechargeable battery 32 will supply DC current to the auxiliary LED light source 22 to cause the auxiliary LED light source 22 to lighten for providing emergency illumination. In such a condition, the prolongation of emergency illumination will promote the personal safety during emergency.

Figure 5:
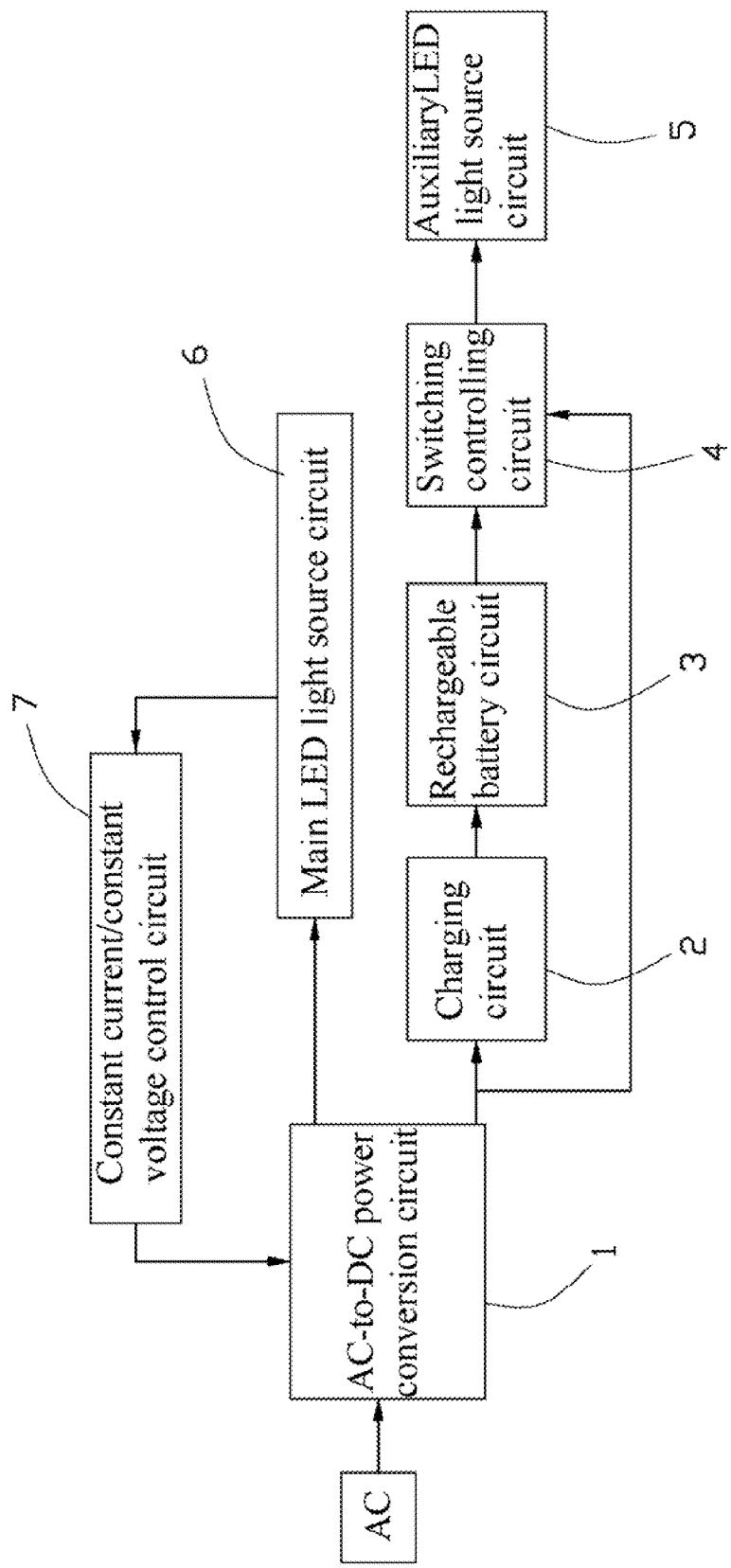
FIG. 5 is a block diagram illustrating a control module of the LED lamp of FIG. 1.

Referring to FIGS. 5 and 6, the control module includes an AC-to-DC power conversion circuit 1, a charging circuit 2, a rechargeable battery circuit 3, a switching controlling circuit 4, an auxiliary LED light source circuit 5, a main LED light source circuit 6, and a constant current/constant voltage control circuit 7. The AC-to-DC power conversion circuit 1, the charging circuit 2, the switching controlling circuit 4 and the constant current/constant voltage control circuit 7 are integrally formed on the circuit board 31.

An input live terminal L and an input neutral terminal N of the AC-to-DC power conversion circuit 1 are connected to the external AC power source via the lamp cap 34. The AC-to-DC power conversion circuit 1 is used for converting the external AC power source into DC power source, and provides a first DC power source 8 at two ends of the capacitor C2 and a second DC power source 9 at two ends of the capacitor C3. The first DC power source 8 is used for charging the rechargeable battery 32 and providing DC current to cause the LED2-LED7 of the auxiliary LED light source 22 to lighten when the environment illumination is not enough.

The charging circuit 2 includes a diode D5 and a current limiting resistor R13 which are connected in series. The anode of the diode D5 is connected to the positive terminal of the first DC power source 8 and the cathode of the diode D5 is connected to one end of the current limiting resistor R13. The diode D5 is used for prevent leakage current from the rechargeable battery BT through the resistor R13 to the capacitor C2. The current limiting resistor R13 is used for limiting the charging current to prevent the rechargeable battery BT from damaging.

The rechargeable battery circuit 3 includes the rechargeable battery BT and a fuse F1. The positive terminal of the rechargeable battery BT is connected to the other end of the current limiting resistor R3, while the negative terminal of the rechargeable battery BT is connected to the negative terminal of the first DC power source 8 through the fuse F1.

The switching controlling circuit 4 includes a capacitor C1, a Zener diode Z1, four diodes D1-D4, six resistors R1-R6, three transistors Q1-Q3, and two phototransistors K1, K2. The transistor Q1 is PNP transistor, while the transistors Q2 and Q3 are NPN transistors.

The anodes of the diodes D1 and D2 are connected to the positive terminal of the first DC power source 8. The cathode of the diode D2 is connected to the negative terminal of the first DC power source 8 successively through two serially connected resistors R1 and R4. The emitter of the transistor Q1 is connected to the positive terminal of the rechargeable battery BT and connected to the cathode of the diode D5 through current limiting resistor R13. The anode of the diode D3 is connected to the base of the transistor Q1. The cathode of the diode D3 is connected to the cathode of the diode D1. The cathode of the Zener diode Z1 is connected to the collector of the transistor Q1, while the anode of the Zener diode Z1 is connected to a junction point between the serially connected resistors R1 and R4.

The collector of the transistor Q2 is connected to the cathodes of the diodes D1 and D3 through the resistor R2. The emitter of the transistor Q2 is connected to the negative terminal of the first DC power source 8. One end of the resistor R3 is connected to the base of the transistor Q2, while the other end of the resistor R3 is connected to a junction point between the serially connected resistors R1 and R4. The other end of the resistor R3 is further connected to the anode of the capacitor C1. The cathode of the capacitor C1 is connected to the negative terminal of the first DC power source 8. The collector of the phototransistor K2 is connected to the base of the transistor Q2. The emitter of the phototransistor K2 is connected to the negative terminal of the first DC power source 8.

The collector of the transistor Q3 is connected to the positive terminal of the first DC power source 8 through resistor R5. The emitter of the transistor Q3 is connected to the anode of the diode D4. The cathode of the diode D4 is connected to the collector of the transistor Q1 and the cathode of the Zener diode Z1. The base of the transistor Q3 is connected to the positive terminal of the first DC power source 8 through resistor R6. The collector of the phototransistor K1 is connected to the base of the transistor Q3.

The auxiliary LED light source circuit 5 includes a plurality of second LEDs (i.e., LED2-LED7) and a plurality of current limiting resistors R7-R12. The cathodes of the LED2-LED7 are connected to the emitter of the phototransistor K1. The anode of each of the LED2-LED7 is connected to the cathode of the diode D4 and the collector of the transistor Q1 through a corresponding resistor R7, R8, R9, R10' R11 or R12.

The main LED light source circuit 6 includes a first LED (i.e., LED1). The anode of the LED1 is connected to the positive terminal of the second DC power source 9. The cathode of the LED1 is connected to the negative terminal of the second DC power source 9 through a current sense resistor R14.

The constant current/constant voltage control circuit 7 includes the current sense resistor R14, a linear photocoupler U1, and a pulse-width modulation integrated circuit (PWM IC), a Zener diode Z2 and a field effect transistor (FET) Q4. The current sense resistor R14 and the Zener diode Z2 are respectively used for providing an electric current feedback signal and a voltage feedback signal to the PWM IC via the linear photocoupler U1, to thereby rectify the waveform of the Q4 for stabilizing the output voltage and electric current of the first DC power source 8 and the second DC power source 9.

When the external AC power source is supplied normally, the AC-to-DC power conversion circuit 1 converts the AC power input into DC power, and provides the first DC power source 8 for charging the rechargeable battery BT and the second DC power source 9 for driving the LED1 of the main LED light source 21 to lighten. The base of the transistor Q1 is connected to the positive terminal of the first DC power source 8 through the diode D3 and the diode D1. A high potential is maintained at the base of the transistor Q1. Thus, the transistor Q1 is turned off. Therefore, the rechargeable battery BT can not supply DC current to the LED2-LED7 of the auxiliary LED light source 22 through the transistor Q1. The first DC power source 8 is divided through the resistors R1 and R4, and then charges the capacitor C1.

At this time, the switching controlling circuit 4 runs in an auxiliary illumination mode. Whether the auxiliary LED light source 22 is turned on is determined by the phototransistor K1. In other words, the phototransistor K1 functions as a switch between the first DC power source 8 and the auxiliary LED light source 22 when the external AC power source is supplied normally. If the environment illumination is not enough (i.e., a value of the environment illumination being below the specified illumination value for turning on the phototransistor K1), the phototransistor K1 is turned off under a weak illumination. The base of the transistor Q3 is connected to the positive terminal of the first DC power source 8 through the resistor R6. A high potential is maintained at the base of the transistor Q3. Thus, the transistor Q3 is turned on. Therefore, the first DC power source 8 can supply DC current to the LED2-LED7 of the auxiliary LED light source 22. The LED2-LED7 of the auxiliary LED light source 22 are turned on to emit light for providing auxiliary illumination. Contrarily, if the environment illumination is enough (i.e., a value of the environment illumination is higher than the specified illumination value for turning on the phototransistor K1), the phototransistor K1 is turned on under a strong illumination. The base of the transistor Q3 is connected to the negative terminal of the first DC power source 8. A low potential is maintained at the base of the transistor Q3. Thus, the transistor Q3 is turned off. Therefore, the first DC power source 8 can not supply DC current to the LED2-LED7 of the auxiliary LED light source 22. The auxiliary LED light source 22 does not provide auxiliary illumination.

When the external AC power source is interrupted, the first DC power source 8 and the second DC power source 9 can not provide DC current output. Therefore, the LED1 of the main LED light source 21 is turned off and the charging circuit 2 stops charging the rechargeable battery BT. The transistor Q3 is turned off. The switching controlling circuit 4 is switched to an emergency illumination mode. The capacitor C1 discharges through the resistor R3. A high potential is maintained at the base of the transistor Q2. Thus, the transistor Q2 is turned on. When the transistor Q2 is turned on, a low potential is maintained at the base of the transistor Q1. Thus, the transistor Q1 is turned on. Therefore, the rechargeable battery BT can supply DC current to the LED2-LED7 of the auxiliary LED light source 22 through the transistor Q3. The LED2-LED7 of the auxiliary LED light source 22 are turned on to emit light for providing emergency illumination. Simultaneously, the rechargeable battery BT continuously charges the capacitor C1 through the Zener diode Z1 to maintain the transistor Q3 to be turned on. Therefore, the rechargeable battery BT can continuously supply DC current to the LED2-LED7 of the auxiliary LED light source 22.

At this time, whether the auxiliary LED light source 22 is turned on is determined by the phototransistor K2. In other words, the phototransistor K2 functions as a switch between the rechargeable battery BT and the auxiliary LED light source 22 when the external AC power source is interrupted. If the environment illumination is not enough (i.e., a value of the environment illumination is below the specified illumination value for turning on the phototransistor K2), the phototransistor K2 is turned off under weak illumination. A working state of the transistor Q3 is not influenced by the phototransistor K2. The transistor Q3 is still turned on. The first DC power source 8 supplies DC current to the LED2-LED7 of the auxiliary LED light source 22. Therefore, the LED2-LED7 of the auxiliary LED light source 22 is turned on to emit light for providing auxiliary illumination. If the environment illumination is enough (i.e., a value of the environment illumination is higher than the specified illumination value for turning on the phototransistor K2), the phototransistor K2 is turned on under strong illumination. The base of the transistor Q3 is connected to the negative terminal of the rechargeable battery BT. A low potential is maintained at the base of the transistor Q2. Thus, the transistor Q2 is turned off. When the transistor Q2 is turned off, a high potential is maintained at the base of the transistor Q1. Thus, the transistor Q1 is turned off. Therefore, the rechargeable battery BT can not supply DC current to the LED2-LED7 of the auxiliary LED light source 22 through the transistor Q1. The auxiliary LED light source 22 does not provide emergency illumination, to thereby save power of the rechargeable battery for prolonging the emergency illumination time.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED lamp, comprising:
   a heat dissipation part comprising a heat sink;
   an optical part arranged at a front end of the heat dissipation part, the optical part comprising a main LED light source and an auxiliary LED light source, the main LED light source and the auxiliary LED light source being thermally attached to an end of the heat sink adjacent to the optical part; and
   an electric part arranged at a rear end of the heat dissipation part, the electric part comprising a shell, a circuit board and a rechargeable battery received in the shell, one end of the shell being connected to the heat sink, the other end of the shell forming a lamp cap, the circuit board forming an AC-to-DC power conversion circuit, a charging circuit and a switching controlling circuit thereon, wherein when an external AC power source is transferred to the AC-to-DC power conversion circuit, the AC-to-DC power conversion circuit converts the AC power source to DC power source and provides a first DC power source at a first output end thereof and a second DC power source at a second output end thereof, the charging circuit being electrically connected to the first output end of the AC-to-DC power conversion circuit to receive the first DC power source, the rechargeable battery being electrically connected to the charging circuit, the auxiliary LED light source being electrically connected to one of the first output end of the AC-to-DC power conversion circuit and the rechargeable battery through the switching controlling circuit, the main LED light source being electrically connected to the second output end of the AC-to-DC power conversion circuit to receive the second DC power source and adapted for providing normal illumination when the external AC power source is supplied normally, the auxiliary LED light source being adapted for providing auxiliary illumination when the external AC power source is supplied normally and for providing emergency illumination when the external AC power source is interrupted, wherein when the external AC power source is supplied normally the switching controlling circuit electrically interconnects the first output end of the AC-to-DC power conversion circuit and the auxiliary LED light source and wherein when the external AC power source is interrupted the switching controlling circuit electrically interconnects the rechargeable battery and the auxiliary LED light source.

2. The LED lamp of claim 1, further comprising a first photoelectric switch and a second photoelectric switch, wherein when the external AC power source is supplied normally the switching controlling circuit electrically interconnects the first output end of the AC-to-DC power conversion circuit and the auxiliary LED light source via the first photoelectric switch, the first photoelectric switch being turned on when an environmental brightness of the LED lamp is below a first selected level and wherein when the external AC power source is interrupted the switching controlling circuit electrically interconnects the rechargeable battery and the auxiliary LED light source via the second photoelectric switch, the second photoelectric switch being turned on when the environmental brightness of the LED lamp is below a second selected level.

3. The LED lamp of claim 2, wherein the first photoelectric switch and the second photoelectric switch are phototransistors.

4. The LED lamp of claim 2, wherein the first photoelectric switch and the second photoelectric switch are formed on the circuit board and extend out of the shell for sensing the environment illumination.

5. The LED lamp of claim 1, wherein the main LED light source comprises a first LED and the auxiliary LED light source comprises a plurality of second LEDs, the second LEDs of the auxiliary LED light source being arranged around the first LED of the main LED light source.

6. The LED lamp of claim 1, wherein the electric part further comprises a supporting plate and a pressing plate, the rechargeable battery being mounted on the supporting plate, the pressing plate being sandwiched between the rechargeable battery and the circuit board.

7. The LED lamp of claim 1, wherein the heat sink comprises a base and a plurality of fins extending outwardly from a peripheral surface of the base, the main LED light source and the auxiliary LED light source being attached on the base of the heat sink.

8. The LED lamp of claim 1, wherein a protecting plate is arranged between the electric part and the heat dissipation part, the protecting plate electrically insulating the electric part from the dissipation part.

9. The LED lamp of claim 1, wherein the main LED light source and the auxiliary LED light source are attached on a substrate.

10. The LED lamp of claim 9, wherein the substrate separates the optical part from the heat dissipation part.

* * * * *